3,142,709
PURIFICATION OF VINYL CHLORIDE
Edward H. Gause and Phillip D. Montgomery, both of Texas City, Tex., assignors to Monsanto Company, a corporation of Delaware
No Drawing. Filed May 22, 1961, Ser. No. 111,429
3 Claims. (Cl. 260—656)

This invention relates to the purification of vinyl chloride and, more particularly, to the purification of vinyl chloride containing butadiene as an impurity.

As is well known, vinyl chloride, a monomer of considerable commercial importance is produced by the addition reaction of acetylene and hydrogen chloride in the presence of suitable catalysts. The acetylene employed if derived from hydrocarbons usually contains minor quantities of contaminants among which is butadiene. This diolefin impurity is carried through the system and the vinyl chloride product recovered from such processes thus contains minor amounts of butadiene, i.e., amounts up to about 200 parts per million, because butadiene is not separable from vinyl chloride by the usual distillation techniques used for purifying the monomer. While at first glance such quantities appear so small as to be insignificant, it has been determined that only traces of butadiene, i.e., 5 p.p.m. or less, act to inhibit the polymerization rate of vinyl chloride significantly and because of this effect the diene cannot be tolerated in the monomer.

Accordingly, it is an object of the present invention to provide a simple, commercially feasible method for purifying vinyl chloride to obtain a product essentially free from butadiene and thus eminently suitable for conversion at efficient rates to high-quality polyvinyl chloride. This and other objects and advantages of the invention which will become apparent from the following description thereof are attained by treating the vinyl chloride containing butadiene with anhydrous hydrogen chloride (HCl). The vinyl chloride free of butadiene can then be readily isolated or recovered.

According to the preferred embodiment of the invention, liquid vinyl chloride containing minor amounts of butadiene is brought into intimate contact with anhydrous HCl at a temperature within the range from about 0° C. to about 100° C. over a period of time from a few minutes to several hours, and the liquid vinyl chloride substantially free from butadiene is then recovered by conventional fractionation techniques.

The following example will serve to illustrate the principle of the invention but is not to be construed as limiting its scope in any manner whatsoever.

*Example*

A series of tests were conducted in which various samples of liquid vinyl chloride containing known minor amounts of butadiene as an impurity were treated with anhydrous HCl. A mild steel bomb constructed from 1.5-inch pipe provided with suitable fittings including a sampling valve and having a volume of approximately 260 cc. was utilized as the purification vessel. The bomb was evacuated and then pressured with a sufficient amount of anhydrous HCl to provide the desired concentration of this treating agent. It was then suspended in liquid nitrogen and 100 g. of the liquid vinyl chloride was introduced into it. The bomb was sealed and warmed to the desired temperature by heating in a constant-temperature oil bath. Samples were taken at 20-minute intervals and analyzed for butadiene content on the gas chromatograph, the same instrument employed for analysis of the vinyl chloride prior to treatment. Results of these tests at various temperatures and concentrations of hydrogen chloride are recorded below. The data obtained demonstrate that treatment with anhydrous HCl effectively removes butadiene from vinyl chloride and that complete removal of this impurity can be accomplished under given conditions.

| Temp., °C. | HCl Added (percent) | BD Content, Initial (p.p.m.) | BD Content, 20 min. (p.p.m.) | BD Content, 40 min. (p.p.m.) | BD Content, 60 min. (p.p.m.) | BD Removed in 60 min. (percent) |
|---|---|---|---|---|---|---|
| 25 | 0.5 | 420 | 270 | 96 | 102 | 75.7 |
| 25 | 1.0 | 461 | 95 | 41 | 31 | 93.3 |
| 25 | 1.5 | 261 | 3 | 0 | 0 | 100 |
| 40 | 2.8 | 300 | 31 | 4 | 0 | 100 |
| 50 | 2.0 | 298 | 75 | 16 | 0 | 100 |
| 60 | 1.2 | 301 | 6 | 3 | 0 | 100 |

It is obvious that various modes of applying the principle of the invention can be employed. The reaction can be carried out, for example, in conventional equipment ordinarily utilized for vapor-liquid reactions such as a countercurrent, bubble-cap, absorption column, or packed tower. In this case where operation would be continuous, the anhydrous HCl would be introduced at the bottom of the column and bubbled upward through the descending liquid vinyl chloride containing butadiene. In batch operations, anhydrous HCl can be introduced under pressure into any suitable apparatus such as a kettle-type reactor, hold tank, or storage tank containing liquid vinyl chloride and maintained in contact with the vinyl chloride for the length of time required for removal of the butadiene therein.

While the purification can be effected at any temperature from about 0° C. to about 100° C., preferred temperatures are those within the range from about 25° C. to about 60° C.

The amount of anhydrous HCl employed and the time required for treatment may vary over wide limits. The minimum amount of HCl required is the stoichiometric quantity necessary to react with all the butadiene present. However, reaction time and other impurities present are also factors to be considered. When other impurities which might react with HCl are present, more HCl is, of course, required to effect complete removal of the butadiene. Generally, amounts of HCl from about 0.5% to about 5% by weight of the vinyl chloride being treated are satisfactory with the time of treatment varying depending upon the butadiene content of the vinyl chloride, the nature of other impurities present, the temperature, and the degree of purification desired. Longer reaction times are required for complete removal at the HCl concentrations ranging from as long as 4–5 hours at the 0.5% level to only about 5 minutes or less at the 5% level. Preferably, HCl is employed in the preferred temperature range in an amount in the range from about 1.5% to about 3% by weight of vinyl chloride treated over periods of time ranging from about 20 minutes to about one hour.

For the most efficient removal of butadiene by the method of the invention, the system should be kept anhydrous. Suitable dehydrating agents such as ferric chloride, calcium chloride, calcium sulfate, and the like can be employed if desired to eliminate all traces of moisture in the liquid vinyl chloride.

Subsequent to treatment with HCl, vinyl chloride substantially free of butadiene can be readily recovered by a conventional fractional distillation by which it is separated from the butadiene-HCl reaction product and any other impurities present.

What is claimed is:
1. A process for the purification of vinyl chloride containing minor amounts of butadiene which consists of intimately contacting said vinyl chloride in the liquid phase with anhydrous hydrogen chloride in an amount from about 0.5% to about 5% by weight of said vinyl chloride at a temperature within the range from about 0° C. to about 100° C. for a period of time from about 5 minutes to about 5 hours and recovering said vinyl chloride.

2. A process for the purification of vinyl chloride containing minor amounts of butadiene which consists of intimately contacting said vinyl chloride in the liquid phase with anhydrous hydrogen chloride in an amount from about 1.5% to about 3% by weight of said vinyl chloride at a temperature within the range from about 25° C. to about 60° C. for a period of time from about 20 minutes to about one hour and recovering said vinyl chloride.

3. A process for the purification of vinyl chloride containing minor amounts of butadiene which consists of intimately contacting said vinyl chloride in the liquid phase with about 1.2% by weight of said vinyl chloride of anhydrous hydrogen chloride at a temperature of about 60° C. for a period of about 40 minutes and recovering said vinyl chloride.

References Cited in the file of this patent

UNITED STATES PATENTS

| | | |
|---|---|---|
| 2,573,695 | Dalnick et al. | Nov. 6, 1951 |
| 2,616,883 | Marous | Nov. 2, 1952 |

FOREIGN PATENTS

| | | |
|---|---|---|
| 564,178 | Belgium | July 22, 1958 |